US012069606B2

(12) United States Patent
Niu et al.

(10) Patent No.: US 12,069,606 B2
(45) Date of Patent: Aug. 20, 2024

(54) TECHNOLOGIES AND METHODS FOR POSITION SENSING

(71) Applicant: Apple Inc., Cupertino, CA (US)

(72) Inventors: Huaning Niu, San Jose, CA (US); Yushu Zhang, Beijing (CN); Yang Tang, San Jose, CA (US); Wei Zeng, Saratoga, CA (US); Jie Cui, San Jose, CA (US); Manasa Raghavan, Sunnyvale, CA (US); Haitong Sun, Cupertino, CA (US); Hong He, San Jose, CA (US); Chunhai Yao, Beijing (CN); Weidong Yang, San Diego, CA (US); Sigen Ye, Whitehouse Station, NJ (US); Oghenekome Oteri, San Diego, CA (US); Chunxuan Ye, San Diego, CA (US); Seyed Ali Akbar Fakoorian, San Diego, CA (US); Dawei Zhang, Saratoga, CA (US); Haijing Hu, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 247 days.

(21) Appl. No.: 17/439,116

(22) PCT Filed: Oct. 9, 2020

(86) PCT No.: PCT/CN2020/120017
§ 371 (c)(1),
(2) Date: Sep. 14, 2021

(87) PCT Pub. No.: WO2022/072304
PCT Pub. Date: Apr. 14, 2022

(65) Prior Publication Data
US 2023/0189196 A1    Jun. 15, 2023

(51) Int. Cl.
*H04W 64/00* (2009.01)
*H04B 1/3827* (2015.01)

(52) U.S. Cl.
CPC .......... *H04W 64/00* (2013.01); *H04B 1/3833* (2013.01)

(58) Field of Classification Search
None
See application file for complete search history.

(56) References Cited

U.S. PATENT DOCUMENTS

2014/0273819 A1*  9/2014  Nadakuduti ............ H04B 5/70
                                                              455/41.1
2019/0076090 A1   3/2019  Yeager et al.
(Continued)

FOREIGN PATENT DOCUMENTS

| CN | 111480301 A | 7/2020 |
| CN | 111656709 A | 9/2020 |
| CN | 111699726 A | 9/2020 |

OTHER PUBLICATIONS

International Application No. PCT/CN2020/120017, International Search Report and Written Opinion, Jun. 24, 2021, 10 pages.
(Continued)

*Primary Examiner* — Frantz Bataille
(74) *Attorney, Agent, or Firm* — Kilpatrick Townsend & Stockton LLP (57) ABSTRACT

The present application relates to devices and components including apparatus, systems, and methods to identify resources for body position sensing and utilize the resources for body position sensing operations via user equipment of a wireless communication system.

20 Claims, 6 Drawing Sheets

(56) References Cited

U.S. PATENT DOCUMENTS

2019/0200365 A1    6/2019  Sampath et al.
2021/0051559 A1*  2/2021  Edge ................... H04W 36/32

OTHER PUBLICATIONS

The International Application No. PCT/CN2020/120017, "International Preliminary Report on Patentability," Apr. 20, 2023, 7 pages.

* cited by examiner

TECHNOLOGIES AND METHODS FOR POSITION SENSING

CROSS-REFERENCES TO RELATED APPLICATIONS

This application is a U.S. National Stage Application of PCT/CN2020/120017, filed Oct. 9, 2020. The disclosure of which is herein incorporated by reference in its entirety for all purposes.

BACKGROUND

Use of user equipment has become a common occurrence in the lives of many individuals. User equipment may transmit signals that may affect objects and/or beings near the user equipment. A maximum permittable exposure (MPE) has been defined for the user equipment.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, a physical or virtual component within a particular device (such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like), or a structure utilized for transmission of a signal within a wireless network. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel." "transmission channel," "data transmission channel," "access channel," "data access channel," "link," "data link," "carrier," "radio-frequency carrier." or any other like term denoting a pathway or medium through which data is communicated. Additionally, the term "link" as used herein refers to a connection between two devices for the purpose of transmitting and receiving information.

The terms "instantiate," "instantiation." and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The term "subject" as used herein refers to one or more objects. Such an object may be a human being. In some embodiments, the term "subject" may refer to a human being, another living being, or some other object to which a maximum permittable exposure (MPE) may be assigned.

Figure 1:
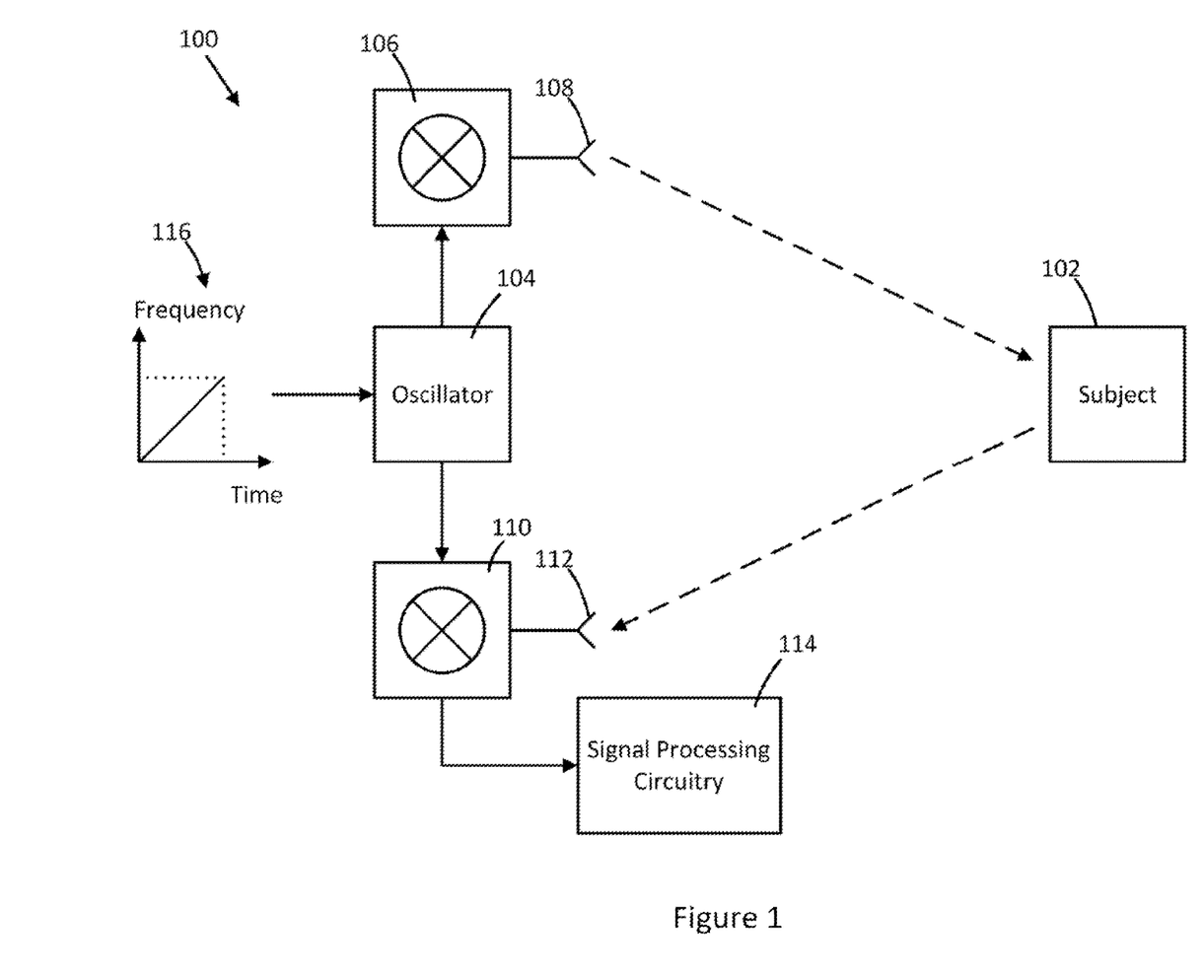
FIG. 1 illustrates an example body position sensing (BPS) arrangement in accordance with some embodiments.
Figure 10:
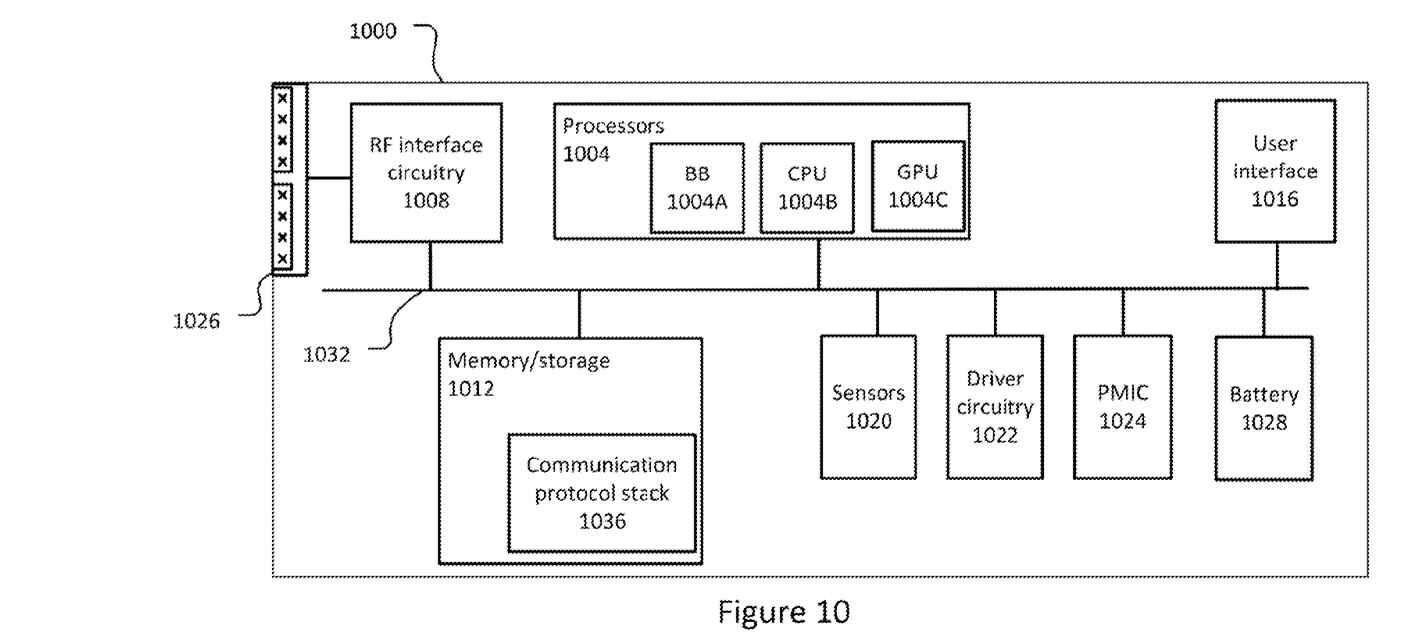
FIG. 10 illustrates a user equipment in accordance with some embodiments.

FIG. 1 illustrates an example body position sensing (BPS) arrangement 100 in accordance with some embodiments. In particular, the BPS arrangement 100 provides a graphical representation of BPS as performed by a user equipment (UE), such as the UE 1000 (FIG. 10). BPS may be utilized by the UE to determine a direction and/or distance between the UE and a subject 102. The body position sensing (BPS) may be performed to assist in meeting a MPE defined for the UE. In particular, the BPS may performed to determine the direction and/or distance to a subject within an area of the user equipment, which can be utilized to determine an amount of exposure to the subject from the user equipment.

The BPS arrangement 100 may include an oscillator 104, a first interface 106, a first antenna 108, a second interface 110, a second antenna 112, and signal processing circuitry 114. The oscillator 104, the first interface 106, the first antenna 108, the second interface 110, the second antenna 112, and the signal processing circuitry 114 may be implemented within the UE, and may be connected to one or more other components within the UE. In some embodiments, the oscillator 104 may comprise a local oscillator of the UE.

The oscillator 104 may receive a signal output by another component of the UE (as represented by the frequency graph 116). The oscillator 104 may produce a signal with a frequency defined by the signal received from the other component of the UE. For example, a voltage and/or current of the signal received from the other component may define a frequency of the signal output by the oscillator 104. The oscillator 104 may produce (either through generation of a signal or modification of a signal) the signal having the defined frequency.

The first interface 106 may receive the signal output by the oscillator 104 and may produce a signal to be output by the first antenna 108 based on the signal received from the oscillator 104. For example, the first interface 106 may receive the signal output by the oscillator 104 and produce a signal with the frequency of the signal output by the oscillator 104. The signal produced by the first interface 106 may be in a format to facilitate wireless transmission of the signal by the first antenna 108. In particular, in response to receiving the signal from the first interface 106, the antenna 108 may wirelessly transmit the signal into the area around the UE. In some embodiments, the signal transmitted by the antenna 108 may have a low power spectrum density and a wide bandwidth. The wireless transmission of the signal by the first antenna 108 may be part of a BPS operation for determining a direction and/or distance between the UE and a subject 102.

A portion of the signal emitted by the first antenna 108 may encounter a body, or some portion thereof, of the subject 102. The portion of the signal that encounters the body, or portion thereof, of the subject 102 may be reflected back off the subject. Characteristics of the portion of the signal reflected back may differ from the signal emitted by the first antenna 108 due to the encounter with the subject 102. For example, the portion of the signal reflected back may have a lower amplitude than the signal emitted from the first antenna 108, or other characteristics of the reflected portion of the signal may differ from the characteristics of the signal emitted by the first antenna 108.

The second antenna 112 may receive the portion of the signal reflected back off the subject 102 and provide the portion of the signal to the second interface 110. The second interface 110 may produce an electrical signal based off the portion of the signal received from the second antenna 112 for signal processing. The second interface 110 may farther receive the signal output by the oscillator 104 and produce a signal based on the signal received from the oscillator 104. For example, the second interface 110 may receive the signal output by the oscillator 104 and produce a signal with the frequency of the signal output by the oscillator 104. The signal produced by the second interface 110 based on the signal received from the oscillator 104 may be equivalent to, or at least similar to, the signal produced by the first interface 106 based on the signal received from the oscillator 104.

The second interface 110 may provide the signal produced based on the reflected signal received by the second antenna, and the signal produced based on the output signal of the oscillator 104 to the signal processing circuitry 114. The signal processing circuitry 114 may process the signal produced based on the reflected signal and the signal produced based on the output signal of the oscillator 104 to determine a direction and/or distance between the UT and the body, or portion thereof, of the subject 102. For example, the signal processing circuitry 114 may include one or more filters, one or more analog-to-digital converters (ADCs), one or more fast Fourier transform (FFTs) circuits, and/or other circuitry to perform signal processing of the signals to determine the direction and/or distance between UE and the body, or portion thereof, of the subject 102.

Based on the determined direction and/or distance of the UE from the body, or portion thereof, of the subject 102, one or more operations of the UE may be adjusted. For example, a maximum permittable exposure (MPE) may be defined for transmissions transmitted by the UT due to subjects around the UE. Based on the determined direction and/or distance of the UE from the body, or portion thereof, of the subject 102, the UE may modify certain operations from standard operation to meet the MPE. In some embodiments, if the distance between the UE and the body, or portion thereof, of the subject 102 is less than a threshold distance, transmissions of the UE may be adjusted from standard transmission. In some embodiments, the transmissions of the UE adjusted from the standard transmission may be the transmissions emitted toward the subject 102. In particular, transmission (Tx) power and/or Tx duty cycle of transmissions to be transmitted by the UE may be reduced from standard Tx power levels and/or standard Tx duty cycles to meet the MPE.

The BPS operation described may interfere with other transmissions and operations to be performed by the UET, since the hardware used for uplink (UL) transmission is partially shared by BPS transmission. For example, performing (or attempting to perform) the BPS operation while other transmissions are being transmitted and/or received by the UE and/or using the same resources as the other transmissions being transmitted and/or received may cause interference, such as one or more antennas of the UE being scheduled to perform two incompatible operations at the same time due to the BPS operation sharing hardware resources with the other transmissions. The other UL and downlink (DL) transmissions may be scheduled to occur at certain times and/or using certain resources. For example, a specification (such as the third generation partnership project (3GPP) new radio (NR) specification) may define the timing of many of the other UL and DL transmissions. Accordingly, it can be beneficial to schedule the BPS operation, or portions thereof, to occur at different times and/or using different resources from the other UL and DL transmissions to avoid interference with the other UL and DL transmissions. For example, it may be beneficial to utilize radio access network (RAN) resources for the BPS operation in a manner that does not interfere with other RAN communications of the UE. The approaches described throughout this disclosure may assist in scheduling the BPS operation, or portions thereof, at different tines and/or using different resources from the other UL and DL transmissions of a UE.

Figure 2:
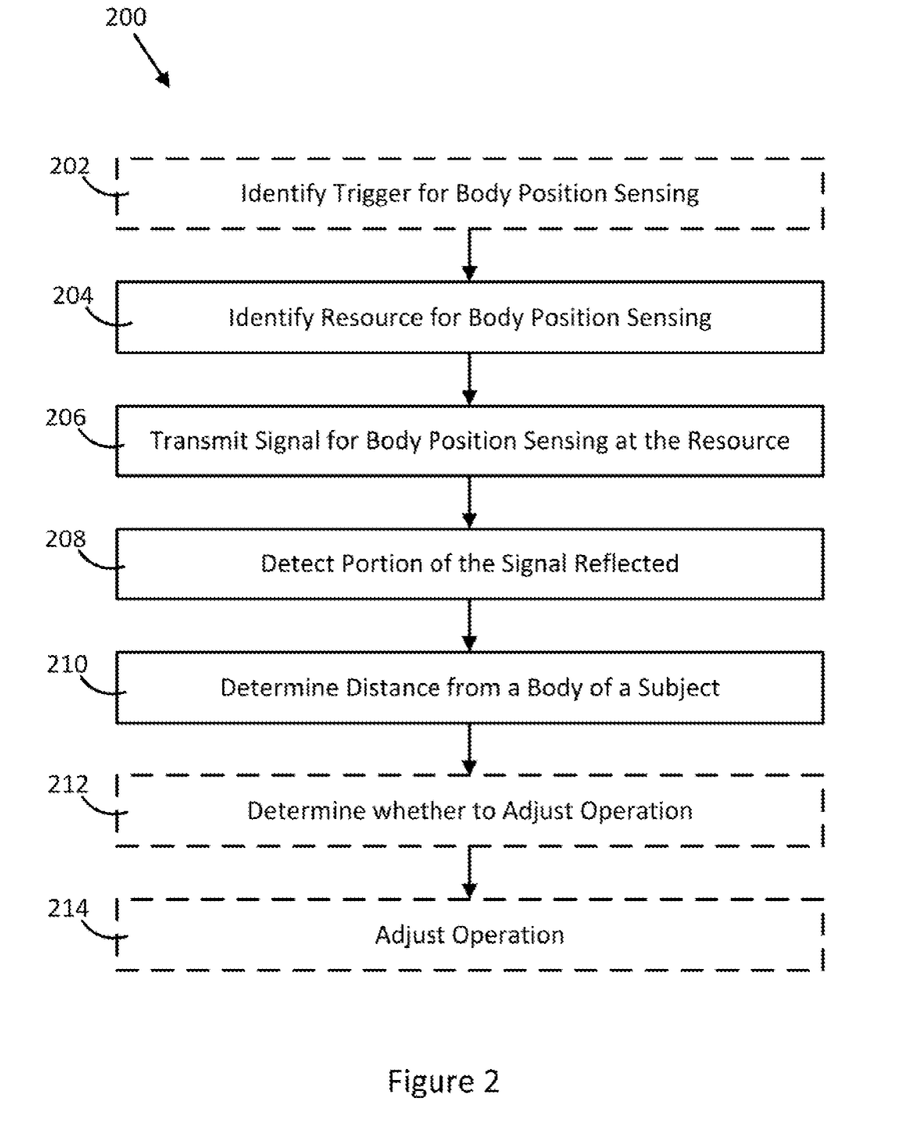
FIG. 2 illustrates an example procedure involving performance of a BPS operation in accordance with some embodiments.

FIG. 2 illustrates an example procedure 200 involving performance of a BPS operation in accordance with some embodiments. In particular, the procedure 200 may be performed by a UE (such as the UE 1000 (FIG. 10)), or one or more components UE (such as one or more of the processors 1004 (FIG. 10)) may perform the procedure 200 and/or cause the procedure 200 to be performed. The procedure 200 may include performance of a BPS operation for determining a direction and/or distance of the UE from a body, or some portion thereof, of a subject.

The procedure 200 may include identifying a trigger for BPS at 202. In particular, the trigger may indicate that the BPS operation is to be performed. The trigger may be generated at the occurrence of certain events. For example, BPS operations may be set to occur with at least a minimum amount of time between the BPS operations, such as to conserve energy that may be consumed by the BPS operations. In these instances, the trigger may be generated at expiration of the minimum amount of time after the previous BPS operation. In other embodiments, the trigger may be generated in response to other events, such as interaction with the DUE, detection of objects and/or movement around the UE, or other events indicating that a subject may be within a proximity of the UE. In other embodiments, 202 may be omitted. For example, the BPS operations may be scheduled for certain times and the trigger may not be required.

The procedure 200 may include identifying a resource for BPS at 204. In particular, a resource for a BPS operation, or some portion thereof, may be identified. FIGS. 3 through 8, and the corresponding description, provide approaches for identifying the resource for the BPS operation, or portion thereof. One or more of the approaches described in relation to FIGS. 3 through 8 may be performed in 204 to identify a resource for the BPS operation. In some embodiments, a single one of the approaches described in relation to FIGS. 3 through 8 may be performed to identify a resource for the BPS operation. In other embodiments, two or more of the approaches described in relation to FIGS. 3 through 8 may be performed to identify a resource for the BPS operation. In these embodiments, the two or more approaches may be performed, or attempted to be performed, to determine whether the one of the approaches identifies a resource for the BPS operation or configuration of the UE facilitates use of one of the approaches to identify a resource for the BPS operation. In some of these embodiments, the two or more approaches may be prioritized, such that the approach with the highest priority capable of identifying a resource for the BPS operation is utilized. In other of these embodiments, the earliest resource identified by the two or more approaches may be the resource identified for the BPS.

The procedure 200 may include transmitting a signal for BPS at the resource at 206. In particular, a signal for a BPS operation may be transmitted at the resource. For example, the signal transmitted by the first antenna 108 (FIG. 1) to reflect off the body of the subject 102 (FIG. 1) may be transmitted at the resource. Depending on the resource identified, transmitting the signal at the resource may comprise transmitting the signal on the resource or transmitting the signal during the resource. In some embodiments, a length of the signal may be a few symbols to a few slots, with total overhead of approximately (within 0.1%) 0.5% of UL transmissions.

The procedure 200 may include detecting a portion of the signal reflected at 208. In particular, a portion of the signal emitted in 206 may be reflected back to the UE off of a body, or some portion thereof, of a subject. The portion of the signal reflected back may be detected when received by the UE. For example, the portion of the signal received by the second antenna 108 (FIG. 1) that has been reflected back off the body of the subject 102 may be detected. In instances where a portion of the signal reflected back cannot be detected (e.g., no portion of the signal is reflected back to the UE), the procedure 200 may be terminated after 206.

The procedure 200 may include determining a direction and/or distance from the body, or some portion thereof, of the subject at 210. In particular, signal processing may be performed on the portion of the signal detected in 208 to determine the direction and/or distance for the body of the subject to the UE.

The procedure 200 may include determining whether operation of the UE is to be adjusted from standard operation based on the direction and/or distance of the UE from the body of the subject at 212. For example, it may be determined whether the distance of the UE from the body of the subject is less than a threshold distance to adjust the operation of the UE. In response to determining that the distance of the UE from the body of the subject is less than the threshold distance, it may be determined that the operation of the UE is to be adjusted from standard operation. In some embodiments, the adjustment from standard operation may include reducing TX power and/or TX duty cycle for transmissions of the UE from the standard TX power and/or standard TX duty cycle for transmissions of the UE. The amount of adjustment and/or the operations adjusted may depend on the distance of the UE from the body of the subject. If it is determined that the distance of the UE from the body of the subject is greater than the threshold distance, it may be determined that the operation of the UE is not to be adjusted from standard operation based on the distance of the UE from the body of the subject.

The procedure 200 may include adjusting the operation of the UE based on the result of the determination of 212 at 214. In particular, if it is determined in 212 that operations are to be adjusted, the adjustments of the operations determined may be performed in 214. If it is determined in 212 that operation of the UE is not to be adjusted based on the distance of the UE from the body of the subject, 214 may be omitted. In some embodiments, the adjustments performed in 214 may be performed for certain transmissions, such as transmissions emitted toward the subject. In some embodiments, 212 and/or 214 may be omitted.

Figure 3:
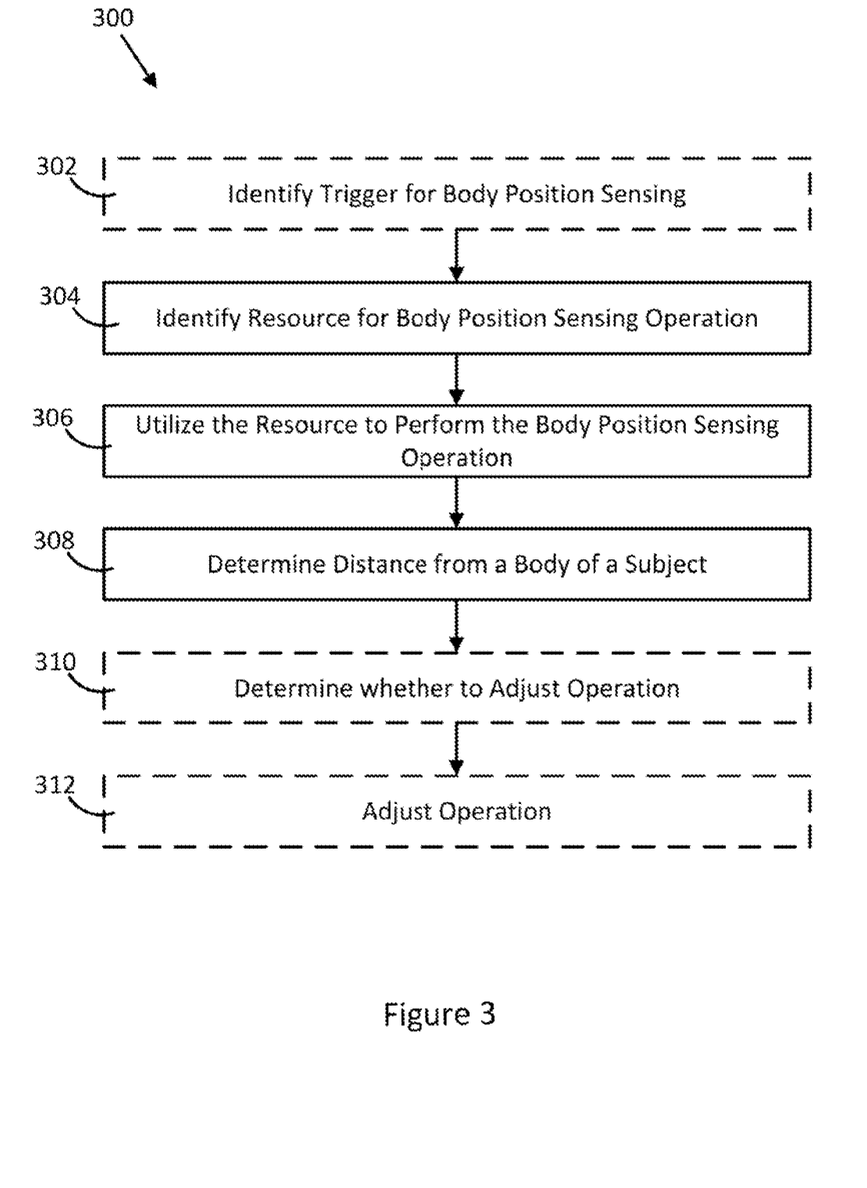
FIG. 3 illustrates another example procedure involving performance of a BPS operation in accordance with some embodiments.

FIG. 3 illustrates another example procedure 300 involving performance of a BPS operation in accordance with some embodiments. In particular, the procedure 300 may be performed by a UE (such as the UE 1000 (FIG. 10)), or one or more components UE (such as one or more of the processors 1004 (FIG. 10)) may perform the procedure 300 and/or cause the procedure 300 to be performed. The procedure 300 may include performance of a BPS operation for determining a direction and/or distance of the UE from a body, or some portion thereof, of a subject.

The procedure 300 may include identifying a trigger for BPS at 302. In particular, the trigger may indicate that the BPS operation is to be performed. The trigger may be generated at the occurrence of certain events. For example, BPS operations may be set to occur with at least a minimum amount of time between the BPS operations, such as to conserve energy that may be consumed by the BPS operations. In these instances, the trigger may be generated at expiration of the minimum amount of time ater the previous BPS operation. In other embodiments, the trigger may be generated in response to other events, such as interaction with the UE, detection of objects and/or movement around the UE, or other events indicating that a subject may be within a proximity of the UE. In other embodiments, 302 may be omitted. For example, the BPS operations may be scheduled for certain times and the trigger may not be required.

The procedure 300 may include identifying a resource for a BPS operation at 304. In particular, a resource fora BPS operation, or some portion thereof, may be identified. The resource may be a resource of a RAN that is available for a BPS operation. FIGS. 3 through 8, and the corresponding description, provide approaches for identifying the resource for the BPS operation, or portion thereof. One or more of the approaches described in relation to FIGS. 3 through 8 may be performed in 304 to identify a resource for the BPS operation. In some embodiments, a single one of the approaches described in relation to FIGS. 3 through 8 may be performed to identify a resource for the BPS operation. In other embodiments, two or more of the approaches described in relation to FIGS. 3 through 8 may be performed to identify a resource for the BPS operation. In these embodiments, the two or more approaches may be performed, or attempted to be performed, to determine whether the one of the approaches identifies a resource for the BPS operation or configuration of the UE facilitates use of one of the approaches to identify a resource for the BPS operation. In some of these embodiments, the two or more approaches may be prioritized, such that the approach with the highest priority capable of identifying a resource for the BPS operation is utilized. In other of these embodiments, the earliest resource identified by the two or more approaches may be the resource identified for the BPS.

The procedure 300 may include utilizing the resource identified at 304 to perform the BPS operation at 306. In particular, the resource may be utilized for transmission of a signal for the BPS operation. For example, the signal transmitted by the first antenna 108 (FIG. 1) to reflect off the body of the subject 102 (FIG. 1) may be transmitted via the resource. Depending on the resource identified, transmitting the signal at the resource may comprise transmitting the signal on the resource or transmitting the signal during the resource. In some embodiments, a length of the signal may be approximately a few symbols to a few slots. Total overhead on average may be (within 0.1%) 0.5% of the UL transmission time. The procedure 300 may further include detecting a portion of the signal reflected at 306. In particular, a portion of the signal emitted may be reflected back to the UE off of a body, or some portion thereof, of a subject. The portion of the signal reflected back may be detected when received by the UE. For example, the portion of the signal received by the second antenna 108 (FIG. 1) that has been reflected back off the body of the subject 102 may be detected. In instances where a portion of the signal reflected back cannot be detected (e.g., no portion of the signal is reflected back to the UE), the procedure 300 may be terminated after 306.

The procedure 300 may include determining a direction and/or distance from the body, or some portion thereof, of the subject at 308. In particular, signal processing may be performed on the portion of the signal detected in 306 to determine the direction and/or distance from the body of the subject to the UE.

The procedure 300 may include determining whether operation of the UE is to be adjusted from standard operation based on the direction and/or distance of the UE from the body of the subject at 310. For example, it may be determined whether the distance of the UE from the body of the subject is less than a threshold distance to adjust the operation of the UE. In response to determining that the distance of the UE from the body of the subject is less than the threshold distance, it may be determined that the operation of the UE is to be adjusted from standard operation. In some embodiments, the adjustment from standard operation may include reducing TX power and/or TX duty cycle for transmissions of the UE from the standard TX power and/or standard TX duty cycle for transmissions of the UE. The amount of adjustment and/or the operations adjusted may depend on the distance of the UE from the body of the subject. If it is determined that the distance of the UE from the body of the subject is greater than the threshold distance, it may be determined that the operation of the UE is not to be adjusted from standard operation based on the distance of the UE from the body of the subject.

The procedure 300 may include adjusting the operation of the UE based on the result of the determination of 310 at 312. In particular, if it is determined in 310 that operations are to be adjusted, the adjustments of the operations determined may be performed in 312. If it is determined in 310 that operation of the UE is not to be adjusted based on the distance of the UE from the body of the subject, 312 may be omitted. In some embodiments, 310 and/or 312 may be omitted.

Figure 4:
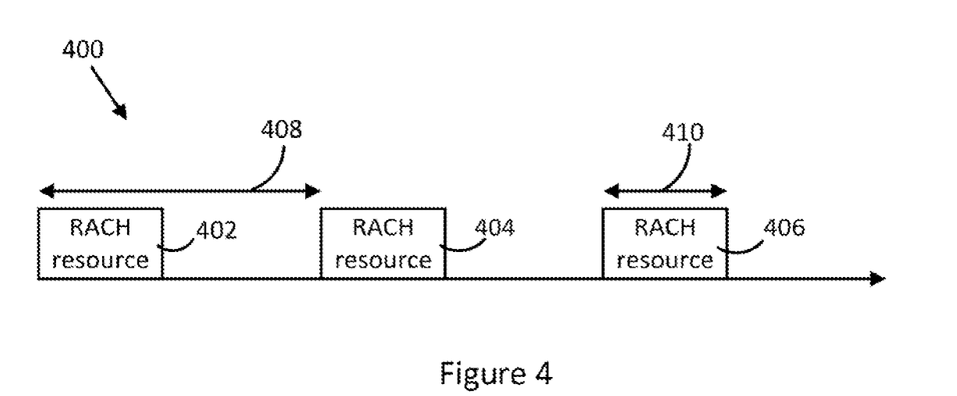
FIG. 4 illustrates an example approach for identifying a resource for BPS in accordance with some embodiments.

FIG. 4 illustrates an example approach 400 for identifying a resource for BPS in accordance with some embodiments. The approach 400 may be a random access channel (RACH) configuration approach. The approach 400 may be performed as part of 204 (FIG. 2).

The approach 400 may be utilized when the UE is configured with contention-based RACH. For example, the UE may be configured with contention-based RACH to perform initial access, UL synchronization, request for other system information (SI), and beam failure recovery, among other operations. The UE may be configured with the contention-based RACH via a RACH configuration common (RACH-ConfigCommon) file of a system information block (SIB) message, such as a SIB 1 (SIB1) message. The RACH-ConfigCommon may define the radio resource for the LIE for RACH transmission. For example, the RACH-ConfigCommon may define the occurrence of RACH resources for RACH transmission and/or the periods for the RACH resources for the UE. The time resource may be periodically configured in the time division duplex (TDD) frequency range 2 (FR2) RachConfig table. The periodicity of the time resource may be derived through the system frame number (SFN). The length of the time resource may be determined with different preamble format.

The approach 400 illustrates an example result of contention-based RACH configuration. In particular, the approach 400 illustrates RACH resources and the corresponding timing that may be produced by the contention-based RACH configuration of the UE. A first RACH resource 402, a second RACH resource 404, and a third RACH resource 406 are illustrated. The RACH resources may be periodic where a periodicity 408 of the RACH resources may be defined by the RACH-ConfigCommon. Further, a length 410 of the RACH resources may be defined by the RACH-ConfigCommon. The approach 400 may include identifying one of the RACH resources for transmission of the signal in 206 (FIG. 2). The identified one of the RACH resources may be utilized for the transmission of the signal without an active UL grant.

Figure 5:
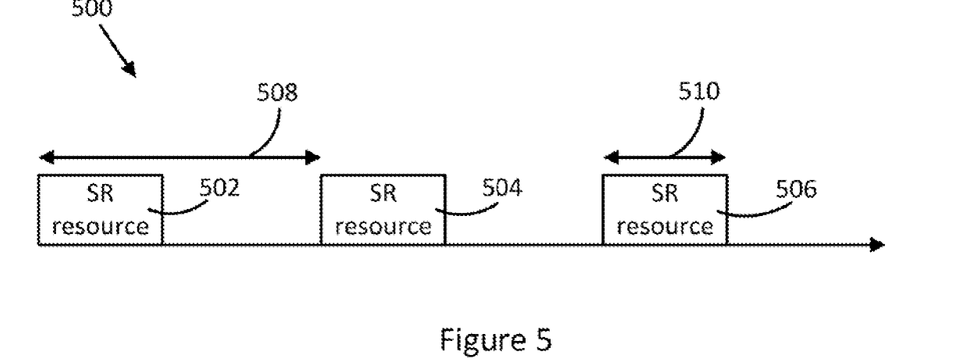
FIG. 5 illustrates another example approach for identifying a resource for BPS in accordance with some embodiments.

FIG. 5 illustrates another example approach 500 for identifying a resource for BPS in accordance with some embodiments. The approach 500 may be a scheduling request (SR) configuration approach. The approach 500 may be performed as part of 204 (FIG. 2).

The approach 500 may be utilized when the UE is configured to send scheduling requests using physical uplink control channel (PUCCH). The UE may be configured with a SR resource configuration (SchedulingRequestResourceConfig) information element. The SchedulingRequestResourceConfig may configure periodicity and/or offset of SR resources. The periodicity of the SR resources may be 2 symbols, 7 symbols, 1 slot, 2 slots, 4 slots, S slots, 16 slots, 40 slots, 80 slots, 160 slots, 320 slots, or 640 slots for a subcarrier spacing (SCS) of 120 kilohertz (KHz). Lengths of the SR resources may follow the PUCCH format 0 configuration or the format 1 configuration in embodiments. In embodiments where the SR resources follow the PUCCH format 0, the SR resources may occupy 1 to 2 orthogonal frequency division multiplexing (OFDM) symbols each. In embodiments where the SR resources follow the PUCCH format 1, the SR resources may occupy 4 to 14 OFDM symbols each.

The approach 500 illustrates an example result of the SR resource configuration. In particular, the approach 500 illustrates SR resources and the corresponding timing that may be produced by the SR resource configuration of the UE A first SR resource 502, a second SR resource 504, and a third SR resource 506 are illustrated. The SR resources may be periodic where a periodicity 508 of the SR resources may be defined by the SchedulingRequestResourceConfig. Further, a length 510 of the SR resources may be defined by the SchedulingRequestResourceConfig. The approach 500 may include identifying one of the SR resources for transmission of the signal in 206 (FIG. 2). The identified one of the SR resources may be utilized for the transmission of the signal without an active UL grant. Different lengths of the signal may be transmitted using the SR resources. The length of the signal transmitted may depend on the identified SR resource. The signal may be transmitted utilizing the identified SR resource.

Figure 6:
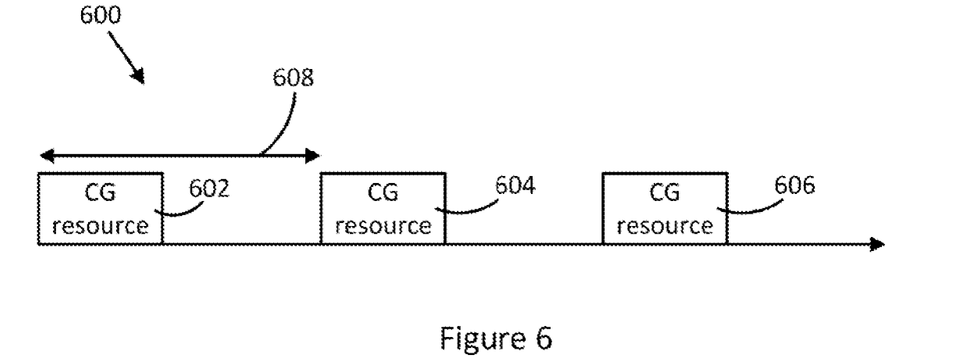
FIG. 6 illustrates another example approach for identifying a resource for BPS in accordance with some embodiments.

FIG. 6 illustrates another example approach 600 for identifying a resource for BPS in accordance with some embodiments. The approach 600 may be a configured grant approach. The approach 600 may be performed as part of 204 (FIG. 2).

The approach 600 may be utilized when the UE is configured with configured grants. The UE may be configured via a radio resource control (RRC) (such as the RRC type 1) or provided via a physical downlink control channel (PDCCH) (which may be addressed to a configured scheduling radio network temporary identifier (CS-RNTI), type 2). A periodicity of the configured grants may be between a minimum of 2 symbols to a maximum of 5120 slots. Multiple configured grants may be configured in one bandwidth part (BWP).

The approach 600 illustrates an example result of the configured grant configuration. In particular, the approach 600 illustrates configured grant resources and the corresponding timing that may be produced by the configured grant configuration of the UE. A first configured grant resource 602, a second configured grant resource 604, and a third configured resource 606 are illustrated. The configured resources may be periodic where a periodicity 608 of the configured grant resources may be between a minimum of 2 symbols to a maximum of 510 slots. The approach 600 may include identifying one of the configured grant resources for transmission of the signal in 206 (FIG. 2). Different lengths of the signal may be transmitted using the configured grant resources. The length of the signal transmitted may depend on the identified configured grant resource. The signal may be transmitted using the identified configured grant resource.

Figure 7:
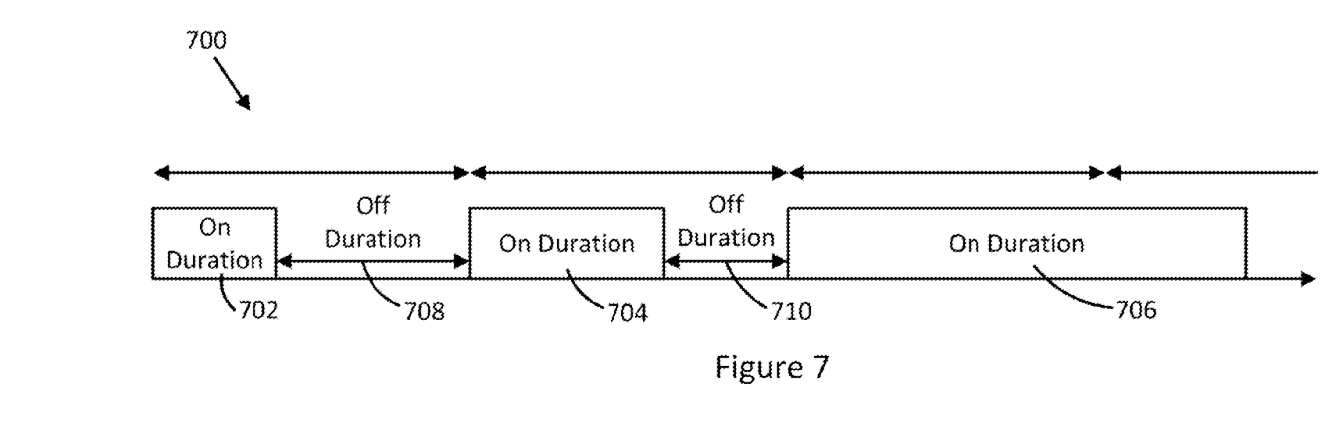
FIG. 7 illustrates another example approach for identifying a resource for BPS in accordance with some embodiments.

FIG. 7 illustrates another example approach 700 for identifying a resource for BPS in accordance with some embodiments. The approach 700 may be a connected-mode discontinuous reception (C-DRX) configuration approach. The approach 700 may be performed as part of 204 (FIG. 2).

The approach 700 may be utilized when the UE is configured in C-DRX configuration. The UE may be configured via discontinuous reception configuration (DRX-Config) information element. The DRX-Config may define the long discontinuous reception (DRX) cycle, a DRX on duration, an in-activity timer, and/or other features of the C-DRX configuration. The long DRX cycle defined may range from 10 milliseconds (ms) up to 10,2402 ms (idle mode). The third generation partnership project (3GPP) specification release 16 may define a PDDCH-based wake up signal and/or allow dynamic skipping of DRX on duration. During the DRX off duration or the dynamically skipped DRX on duration, the UE may not be required to monitor any DL PDCCH transmissions.

The approach 700 illustrates an example result of the C-DRX configuration. In particular, the approach 700 illustrates on durations and off durations that may be defined by the C-DRX configuration and/or the state of the UE (such as transmissions being received by the UE and/or the time since transmissions were received by the UE). The approach illustrates a first on duration 702, a second on duration 704, and a third on duration 706. In the illustrated embodiment, the durations of the first on duration 702, the second on duration 704, and the third on duration 706 may differ based on the state of the UE. The approach 700 further illustrates a first off duration 708 and a second off duration 710 located between the on durations. The approach 700 may include identifying one of the off durations for transmission of the signal in 206 (FIG. 2). The signal may be transmitted during the identified off duration.

Figure 8:
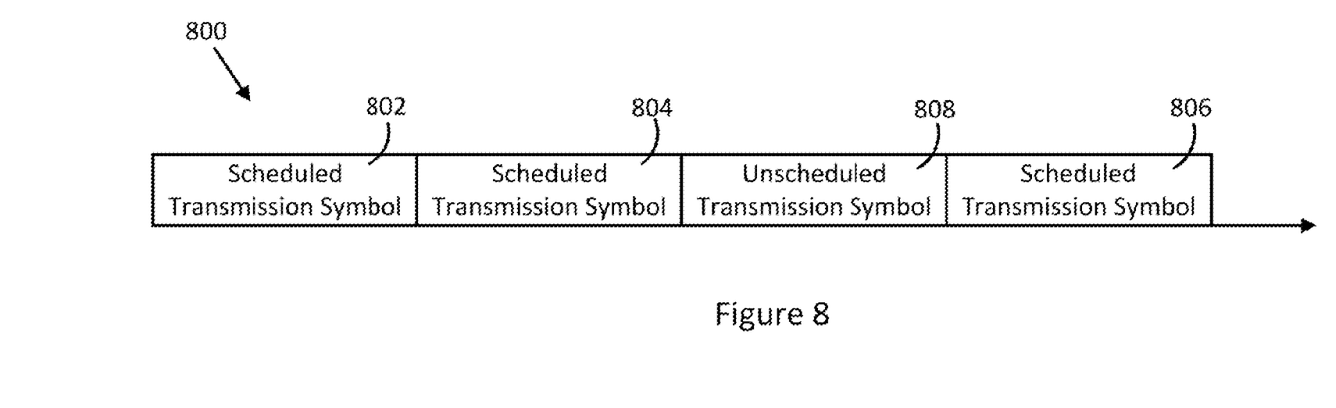
FIG. 8 illustrates another example approach for identifying a resource for BPS in accordance with some embodiments.

FIG. 8 illustrates another example approach 800 for identifying a resource for BPS in accordance with some embodiments. The approach 800 may be a dynamic monitoring approach. The approach 800 may be performed as part of 204 (FIG. 2).

The approach 800 may be utilized when the UE is configured via a time division duplex uplink-downlink configuration common (tdd-UL-DL-ConfigurationCommon) parameter or a time division duplex uplink-downlink configuration dedicated (tdd-U L-DL-ConfigurationDedicated) parameter. The tdd-UL-DL-ConfigurationCommon or the tdd-UL-DL-ConfigurationDedicated may define sets of symbols configured for UL transmission. The UE may be aware of the sets of symbols configured for UL transmission. For flexible symbols, the UE may monitor downlink control information (DCI) format 2-0 to determine slot format based on DCI 2-0 indications.

The approach 800 illustrates an example result of the configuration via the tdd-UL-DL-ConfigurationCommon parameter or the tdd-UL-DL-ConfigurationDedicated parameter. In particular, the approach 800 illustrates sets of scheduled transmission symbols and sets of unscheduled transmission symbols that may be produced by the configuration via the tdd-UL-DL-ConfigurationCommon parameter or the tdd-UL-DL-ConfigurationDedicated parameter. The approach illustrates a first set of scheduled transmission symbols 802, a second set of scheduled transmission symbols 804, and a third set of scheduled transmission symbols 806. The approach 800 further illustrates a set of unscheduled transmission symbols 808, where the unscheduled transmission symbols 808 are not scheduled for transmissions via the configuration. The approach 800 may include identifying one of the sets of unscheduled transmission symbols for transmission of the signal in 206 (FIG. 2). The sets of unscheduled transmission symbols may be unscheduled by dynamic DCI. The signal may be transmitted using one or more of the transmission symbols within the identified set of unscheduled transmission symbols.

Figure 9:
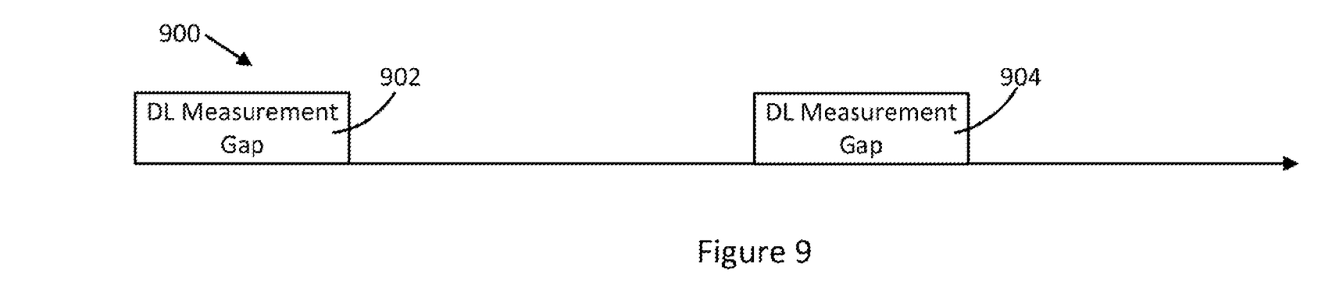
FIG. 9 illustrates another example approach for identifying a resource for BPS in accordance with some embodiments.

FIG. 9 illustrates another example approach 900 for identifying a resource for BPS in accordance with some embodiments. The approach 900 may be a DL measurement gap approach. The approach 900 may be performed as part of 204 (FIG. 2).

The approach 900 may be utilized when the UE is configured with one or more DL measurement gaps. The approach 900 illustrates a first DL measurement gap 902 and a second DL measurement gap 904 that may be configured for the UE. The measurement gaps may be configured to perform of one or more different measurement purposes. The approach 900 may include identifying one of the DL measurement gaps for transmission of the signal in 206 (FIG. 2). The signal may be transmitted during the identified DL 13 measurement gap.

FIG. 10 illustrates a UE 1000 in accordance with some embodiments. The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE may be a RedCap UE or NR-Light UE.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown nay occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 may include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1008 may include transceiver circuitry and radio frequency front module (RFEM) that allows the UE. 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency hands including bands in FR1 or FR2.

The user interface circuitry 1016 includes various input/output (IO) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (IO) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the LE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC_Idle state, where it disconnects from the network and does not perform operations such as channel quality feedback, handover, etc. The UE 1000 goes into a very low power state and it performs paging where again it periodically wakes up to listen to the network and then powers down again. The UE 1000 may not receive data in this state; in order to receive data, it may transition back to RRC_Connected state. An additional power saving mode may allow a device to be unavailable to the network for periods longer than a paging interval (ranging from seconds to a few hours). During this time, the device is unreachable to the network and may power down completely. Any data sent during this time incurs a large delay and it is assumed the delay is acceptable.

A battery 1028 may power the UE 1000, although in some examples the UE 1000 may be mounted deployed in a fixed location, and may have a power supply coupled to an electrical grid. The battery 1028 may be a lithium ion battery, a metal-all battery, such as a zinc-air battery, an aluminium-air battery, a lithium-air battery, and the like. In some implementations, such as in vehicle-based applications, the battery 1028 may be a typical lead-acid automotive battery.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the location of the subject relative to the UE may be utilized for determining an amount of exposure that may be applied to the subject by the UE. The determined amount of exposure that may be applied to the subject may be utilized for determining The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 may include the one or more computer-readable media having instructions that, when executed by one or more processors, cause a user equipment (UE) to identify a radio access network (RAN) configuration, identify, based on the RAN configuration, a resource that is available for a body position sensing (BPS) signal, and transmit the BPS signal in the resource.

Example 2 may include the one or more computer-readable media of example 1, wherein to identify the resource includes to identify a configured random access channel (RACH) resource, and transmit the BPS signal includes to transmit the BPS signal during a configured RACH period corresponding to the configured RACH resource.

Example 3 may include the one or more computer-readable media of example 1 wherein to identify the resource includes to identify a scheduling request (SR) resource, and transmit the BPS signal includes to transmit the BPS signal using the SR resource.

Example 4 may include the one or more computer-readable media of example 1, wherein to identify the resource includes to identify a configured grant resource for uplink transmission, and transmit the BPS signal includes to transmit the BPS signal using the configured grant resource.

Example 5 may include the computer-readable media of example 1, wherein to identify the resource includes to identify discontinuous reception (DRX) off time within a connected-mode discontinuous reception (C-DRX) configuration of the UE, and transmit the BPS signal includes to transmit the BPS signal during the DRX off time.

Example 6 may include the one or more computer-readable media of example 1, wherein to identify the resource includes to identify one or more uplink (UL) transmission symbols available for transmission based on a downlink control information (DCI) indication for the UE, and transmit the BPS signal includes to transmit the BPS signal using the one or more UL transmission symbols available for transmission.

Example 7 may include the one or more computer-readable media of example 1, wherein to identify the resource includes to identify a downlink (DL) measurement gap configured for a measurement, and transmit the BPS signal includes to transmit the BPS signal during the DL measurement gap.

Example 8 may include the one or more computer-readable media of example 1, wherein the instructions, when executed by the one or more processors, further cause the UE to determine a distance of the UE from a body of a subject based on the BPS signal.

Example 9 may include a user equipment (UE) comprising memory to store a configuration for radio access network (RAN) communications of the UE, and processing circuitry coupled with the memory, the processing circuitry to identify a resource available for body position sensing (BPS) based on the configuration for RAN communications of the UE, transmit a BPS signal at the resource, and determine a distance of the UE relative to a body of a subject based on the BPS signal.

Example 10 may include the UE of example 9, wherein to identify the resource includes to identify a configured random access channel (RACH) period configured for RACH transmission, and transmit the BPS signal includes to transmit the BPS signal during the RACH period.

Example 11 may include the UE of example 9, wherein to identify the resource includes to identify a scheduling request (SR) resource available for BPS, and transmit the BPS signal includes to transmit the BPS signal using the SR resource.

Example 12 may include the UE of example 9, wherein to identify the resource includes to identify a configured grant resource for uplink transmission, and transmit the BPS signal includes to transmit the BPS signal using the configured grant resource.

Example 13 may include the UE of example 9, wherein the configuration for communications of the UE comprises a connected-mode discontinuous reception (C-DRX) configuration, and wherein to identify the resource includes to identify a discontinuous reception (DRX) off time from the C-DRX configuration, and transmit the BPS signal includes to transmit the BPS signal during the DRX off time.

Example 14 may include the UE of example 9, wherein the configuration for communications of the UE comprises a time division duplex (TDD) uplink-downlink (UL-DL) configuration, and wherein to identify the resource includes to identify one or more uplink (UL) transmission symbols available for BPS based on the TDD UL-DL configuration, and transmit the BPS signal includes to transmit the BPS signal using the or more UL transmission symbols.

Example 15 may include the UE of example 9, wherein to identify the resource includes to identify a downlink (DL) measurement gap based on the configuration for communications of the UE, and transmit the BPS signal includes to transmit the BPS signal during the DL measurement gap.

Example 16 may include a method of operating a user equipment (UE) comprising identifying a resource of a radio access network (RAN) available for a transmission of a signal of a body position sensing operation, transmitting the signal at the resource, detecting a reflected portion of the signal received at the UE, and determining a distance of the UE relative to a body of a subject based on the reflected portion of the signal.

Example 17 may include the method of example 16, wherein identifying the resource includes identifying a configured random access channel (RACH) period available for RACH transmission, and transmitting the signal includes transmitting the signal during the RACH period.

Example 18 may include the method of example 17, wherein the transmitting the signal during the RACH period is performed without an active uplink (UL) grant.

Example 19 may include the method of example 17, wherein the configured RACH period is defined by a RACH common configuration field (RACH-ConfigCommon) of a system information block (SIB) message.

Example 20 may include the method of example 16, wherein identifying the resource includes identifying a scheduling request (SR) resource available for transmission of the signal, and transmitting the signal includes transmitting the signal using the SR resource.

Example 21 may include the method of example 20, wherein the body position sensing operation is performed without an active uplink (UL) grant.

Example 22 may include the method of example 20, wherein the SR resource is defined by a scheduling request resource configuration (SchedulingRequestResourceConfig) information element.

Example 23 may include the method of example 20, wherein the SR resource occupies one or two orthogonal frequency division multiplexing (OFDM) symbols.

Example 24 may include the method of example 20, wherein the SR resource occupies between four and fourteen orthogonal frequency division multiplexing (OFDM) symbols.

Example 25 may include the method of example 20, wherein a length of the signal depends on the SR resource identified.

Example 26 may include the method of example 16, wherein identifying the resource includes identifying a configured grant resource, the configured grant resource configured for uplink (UL) transmission, and transmitting the signal includes transmitting the signal using the configured grant resource.

Example 27 may include the method of example 2:6, wherein the configured grant resource is defined via a radio resource control (RRC).

Example 28 may include the method of example 2:6, wherein the configured grant resource is defined via a physical downlink control channel (PDCCH).

Example 29 may include the method of example 26, wherein a length of the signal depends on the configured grant resource identified.

Example 30 may include the method of example 16, wherein identifying the resource includes identifying a discontinuous reception (DRX) off time in DRX of the UE, and transmitting the signal includes transmitting the signal during the DRX off time.

Example 31 may include the method of example 30, wherein the DRX off time is defined via a DRX configuration (DRX-Config) information element.

Example 32 may include the method of example 16, wherein identifying the resource includes identifying one or more uplink (UL) transmission symbols that are unscheduled, and transmitting the signal includes transmitting the signal using the one or more UL transmission symbols that are unscheduled.

Example 33 may include the method of example 32, wherein the one or more UL transmission symbols that are unscheduled are defined by a time division duplex uplink-downlink configuration common (tdd-UL-DL-ConfigurationCommon) parameter or a time division duplex uplink-downlink configuration dedicated (tdd-UL-DL-ConfigurationDedicated) parameter.

Example 34 may include the method of example 32, wherein the one or more UL transmission symbols are identified based on a downlink control information (DCI) indication.

Example 35 may include the method of example 16, wherein identifying the resource available for the transmission of the signal includes identifying a downlink (DL) measurement gap configured for one or more measurements, and transmitting the signal includes transmitting the signal during the DL measurement gap.

Example 36 may include the method of example 16, further comprising determining whether to adjust transmissions of the UE based on the distance of the UE relative to the body of the subject.

Example 37 may include the method of example 36, further comprising adjusting a transmission power or a transmission duty cycle of transmissions of the UE in response to determining that the transmissions of the UE are to be adjusted.

Example 38 may include one or more non-transitory, computer-readable media having instructions that, when executed by one or more processors, cause a user equipment (UE) to perform the operations of any of the examples 1-37.

Example 39 may include a user equipment (LIE) (such as the UE 1000 (FIG. 10) and/or the UE of example 9) to perform the operations of any of the examples 1-37.

Example 40 may include an apparatus comprising means to perform one or more elements of a method described in or related to any of examples 1-37, or any other method or process described herein.

Example 41 may include an apparatus comprising logic, modules, or circuitry to perform one or more elements of a method described in or related to any of examples 1-37, or any other method or process described herein.

Example 42 may include a method, technique, or process as described in or related to any of examples 1-37, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of examples 1-37, or portions thereof.

Example 44 may include a signal as described in or related to any of examples 1-37, or portions or parts thereof.

Example 45 may include a datagram, information element, packet, frame, segment, PDU, or message as described in or related to any of examples 1-37, or portions or parts thereof, or otherwise described in the present disclosure.

Example 46 may include a signal encoded with data as described in or related to any of examples 1-37, or portions or parts thereof, or otherwise described in the present disclosure.

Example 47 may include a signal encoded with a datagram, IE, packet, frame, segment, PDU, or message as described in or related to any of examples 1-37, or portions or parts thereof, or otherwise described in the present disclosure.

Example 48 may include an electromagnetic signal carrying computer-readable instructions, wherein execution of the computer-readable instructions by one or more processors is to cause the one or more processors to perform the method, techniques, or process as described in or related to any of examples 1-37, or portions thereof.

Example 49 may include a computer program comprising instructions, wherein execution of the program by a processing element is to cause the processing element to carry out the method, techniques, or process as described in or related to any of examples 1-37, or portions thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed by one or more processors, cause device to:
   identify a radio access network (RAN) configuration;
   identify, based on the RAN configuration, a resource that is available for a body position sensing (BPS) signal; and
   generate the BPS signal for transmission using the resource.

2. The one or more non-transitory, computer-readable media of claim 1, wherein to:
   identify the resource includes to identify a configured random access channel (RACH) resource; and
   generate the BPS signal includes to generate the BPS signal for transmission during a configured RACH period corresponding to the configured RACH resource.

3. The one or more non-transitory, computer-readable media of claim 1, wherein to:
   identify the resource includes to identify a scheduling request (SR) resource; and
   generate the BPS signal includes to generate the BPS signal for transmission using the SR resource.

4. The one or more non-transitory, computer-readable media of claim 1, wherein to:
   identify the resource includes to identify a configured grant resource for uplink transmission; and
   generate the BPS signal includes to generate the BPS signal for transmission using the configured grant resource.

5. The one or more non-transitory, computer-readable media of claim 1, wherein to:
   identify the resource includes to identify discontinuous reception (DRX) off time within a connected-mode discontinuous reception (C-DRX) configuration of a user equipment (UE); and
   generate the BPS signal includes to generate the BPS signal for transmission during the DRX off time.

6. The one or more non-transitory, computer-readable media of claim 1, wherein to:
   identify the resource includes to identify one or more uplink (UL) transmission symbols available for transmission based on a downlink control information (DCI) indication for the UE; and
   generate the BPS signal includes to generate the BPS signal for transmission using the one or more UL transmission symbols available for transmission.

7. The one or more non-transitory, computer-readable media of claim 1, wherein to:
   identify the resource includes to identify a downlink (DL) measurement gap configured for a measurement; and
   generate the BPS signal includes to generate the BPS signal for transmission during the DL measurement gap.

8. A baseband processor comprising:
   processing circuitry to:
   identify a resource available for body position sensing (BPS) based on a configuration for radio access network (RAN) communications of a user equipment (UE);
   generate a BPS signal for transmission using the resource; and
   determine a distance of the UE relative to a body of a subject based on the BPS signal.

9. The baseband processor of claim 8, wherein to:
   identify the resource includes to identify a configured random access channel (RACH) period configured for RACH transmission; and
   generate the BPS signal includes to generate the BPS signal for transmission during the RACH period.

10. The baseband processor of claim 8, wherein to:
    identify the resource includes to identify a scheduling request (SR) resource available for BPS; and
    generate the BPS signal includes to generate the BPS signal for transmission using the SR resource.

11. The baseband processor of claim 8, wherein to:
    identify the resource includes to identify a configured grant resource for uplink transmission; and
    generate the BPS signal includes to generate the BPS signal for transmission using the configured grant resource.

12. The baseband processor of claim 8, wherein the configuration for RAN communications of the UE comprises a connected-mode discontinuous reception (C-DRX) configuration, and wherein to:
    identify the resource includes to identify a discontinuous reception (DRX) off time from the C-DRX configuration; and
    generate the BPS signal includes to generate the BPS signal for transmission during the DRX off time.

13. The baseband processor of claim 8, wherein to:
    identify the resource includes to identify a downlink (DL) measurement gap based on the configuration for RAN communications of the UE; and
    generate the BPS signal includes to generate the BPS signal for transmission during the DL measurement gap.

14. A method comprising:
    identifying a resource of a radio access network (RAN) available for a transmission of a signal of a body position sensing (BPS) operation;
    generating the signal for transmission using the resource;
    detecting a reflected portion of the signal received at a user equipment (UE); and
    determining a distance of the UE relative to a body of a subject based on the reflected portion of the signal.

15. The method of claim 14, wherein:
    identifying the resource includes identifying a configured random access channel (RACH) period available for RACH transmission; and
    generating the signal includes generating the signal for transmission during the RACH period.

16. The method of claim 14, wherein:
    identifying the resource includes identifying a scheduling request (SR) resource available for transmission of the signal; and
    generating the signal includes generating the signal for transmission using the SR resource.

17. The method of claim 14, wherein:
identifying the resource includes identifying a configured grant resource, the configured grant resource configured for uplink (UL) transmission; and
generating the signal includes generating the signal for transmission using the configured grant resource.

18. The method of claim 14, wherein:
identifying the resource includes identifying a discontinuous reception (DRX) off time in DRX of the UE; and
generating the signal includes generating the signal for transmission during the DRX off time.

19. The method of claim 14, wherein:
identifying the resource includes identifying one or more uplink (UL) transmission symbols that are unscheduled; and
generating the signal includes generating the signal for transmission using the one or more UL transmission symbols that are unscheduled.

20. The one or more non-transitory, computer-readable media of claim 1, wherein the BPS signal is to be transmitted at a different time from any other transmissions of the device or the resource being a different resource from other transmissions of the device.

\* \* \* \* \*

UNITED STATES PATENT AND TRADEMARK OFFICE
CERTIFICATE OF CORRECTION

| | | |
|---|---|---|
| PATENT NO. | : 12,069,606 B2 | Page 1 of 1 |
| APPLICATION NO. | : 17/439116 | |
| DATED | : August 20, 2024 | |
| INVENTOR(S) | : Huaning Niu et al. | |

It is certified that error appears in the above-identified patent and that said Letters Patent is hereby corrected as shown below:

On the Title Page

Item (87) PCT Pub. No.: please delete "WO2022/072304" and insert --WO2022/073204--.

In the Claims

Column 21, Line 16: In Claim 1 please insert --a-- before the word device.

Signed and Sealed this
Eighth Day of October, 2024

Katherine Kelly Vidal
*Director of the United States Patent and Trademark Office*